(12) United States Patent
Maass et al.

(10) Patent No.: US 9,022,897 B2
(45) Date of Patent: May 5, 2015

(54) METHOD AND DEVICE FOR OPERATING A DRIVE DEVICE

(75) Inventors: Alexander Maass, Ludwigsburg (DE); Boyke Richter, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 136 days.

(21) Appl. No.: 13/980,499

(22) PCT Filed: Dec. 1, 2011

(86) PCT No.: PCT/EP2011/071466
§ 371 (c)(1),
(2), (4) Date: Aug. 29, 2013

(87) PCT Pub. No.: WO2012/097905
PCT Pub. Date: Jul. 26, 2012

(65) Prior Publication Data
US 2013/0337973 A1 Dec. 19, 2013

(30) Foreign Application Priority Data

Jan. 19, 2011 (DE) .......................... 10 2011 002 887
Jan. 25, 2011 (DE) .......................... 10 2011 003 080

(51) Int. Cl.
*B60W 20/00* (2006.01)
*B60W 10/02* (2006.01)
(Continued)

(52) U.S. Cl.
CPC ............... *B60W 20/10* (2013.01); *Y10T 477/26* (2015.01); *B60W 20/40* (2013.01); *B60W 10/02* (2013.01);
(Continued)

(58) Field of Classification Search
CPC ... B60W 20/10; B60W 10/113; B60W 10/02; B60W 10/06; B60W 10/08; B60W 30/192; B60W 20/40; Y10S 903/902; Y10T 477/26; Y02T 10/6286
See application file for complete search history.

(56) References Cited

U.S. PATENT DOCUMENTS

| 2005/0139035 A1 | 6/2005 | Lee et al. |
| 2011/0082609 A1* | 4/2011 | Favaretto .......................... 701/22 |
| 2011/0203860 A1* | 8/2011 | Sauvlet et al. ............. 180/65.28 |

FOREIGN PATENT DOCUMENTS

| DE | 102007022774 | 11/2008 |
| DE | 102007050659 | 4/2009 |
| WO | 2010/009943 | 1/2010 |

OTHER PUBLICATIONS

International Search Report for Application No. PCT/EP2011/071466 dated Jul. 23, 2012 (2 pages).

*Primary Examiner* — Sherry Estremsky
(74) *Attorney, Agent, or Firm* — Michael Best & Friedrich LLP (57) ABSTRACT

The invention relates to a method for operating a drive device (1) of a motor vehicle, said drive device (1) comprising at least one combustion engine (3) and at least one electric machine (9), as well as a dual clutch transmission (4) which can be functionally connected to the combustion engine (3) and which comprises a first sub-transmission (5), a first clutch (6) being associated therewith, and a second sub-transmission (7), a second clutch (8) and the electric machine (9) being associated therewith. In a purely electrical driving operation, the electric machine (9) is operated in a motorized manner, a driving gear is engaged in the second sub-transmission (7), and both clutches (6, 8) are disengaged. According to the invention, in order to start the combustion engine (3) during the electric driving operation, the second clutch (8) is engaged so as to drive the combustion engine (3) by means of the electric machine (9), a gear is engaged in the first sub-transmission (5), said gear having a lower gear ratio than the engaged driving gear of the second sub-transmission (7), the first clutch (6) is brought into a slip position and the second sub-transmission (7) is subsequently brought into a neutral position, the rotational speed of the electric machine (9) is increased at least to a starting rotational speed for the combustion engine (3) with the slip of the first clutch (6) being adjusted to maintain a forward torque of the motor vehicle, and the combustion engine (3) is started once its starting rotational speed has been reached. In addition, the invention relates to a device for operating a drive device of a motor vehicle.

10 Claims, 6 Drawing Sheets

(51) Int. Cl.
*B60W 10/06* (2006.01)
*B60W 10/08* (2006.01)
*B60W 10/113* (2012.01)
*B60W 30/192* (2012.01)

(52) U.S. Cl.
CPC ............... *B60W 10/06* (2013.01); *B60W 10/08* (2013.01); *B60W 10/113* (2013.01); *B60W 20/00* (2013.01); *B60W 30/192* (2013.01); *Y02T 10/6286* (2013.01); *Y10S 903/902* (2013.01)

METHOD AND DEVICE FOR OPERATING A DRIVE DEVICE

BACKGROUND OF THE INVENTION

The invention relates to a method for operating a drive device of a motor vehicle, said drive device comprising at least one combustion engine and at least one electric machine, as well as a dual clutch transmission which can be functionally connected to the combustion engine and which comprises a first sub-transmission, a first clutch being associated therewith, and a second sub-transmission, a second clutch and the electric machine being associated therewith. In a purely electrical driving operation, in particular for generating a forward torque for the motor vehicle or, respectively, to the driving wheels of said motor vehicle, the electric machine is operated in a motorized manner, a driving gear is engaged in the second sub-transmission and both clutches are disengaged.

The invention further relates to a device for operating a drive device of a motor vehicle, in particular for carrying out the method described above, said drive device comprising at least one combustion engine and at least one electric machine, as well as a dual clutch transmission which can be functionally connected to the combustion engine and which comprises a first sub-transmission, a first clutch being associated therewith, and a second sub-transmission, a second clutch and the electric machine being associated therewith. The device comprises means for controlling the drive device and said means control said drive device for a purely electrical driving operation in such a manner that the electrical machine is operated in a motorized manner, a driving gear is engaged in the second sub-transmission and both clutches are disengaged.

Methods of the kind mentioned above are known from the prior art. In the case of so-called hybrid drive devices, a combustion engine as well as an electric machine can be used to drive the motor vehicle. The drive device can thereby be operated such that the combustion engine and the electric machine apply a collective torque to the drive wheels of the motor vehicle, or a driving operation purely in the combustion engine mode or a purely electrical driving operation occurs. In the case of a purely electrical driving operation, both clutches to the combustion engine are disengaged; and a gear is engaged in the sub-transmission with which the electric machine is associated in order to direct the torque generated by the electric machine to the driving wheels. In the process, the electric machine is supplied with electrical energy from an electrical storage unit of the drive device. If the charging state of the electrical storage unit reaches a critical state for further operation of the electric machine, it is necessary to recharge the electrical storage unit by means of said electric machine being operated in a generating manner. To this end, the drive torque from the other drive unit, i.e. from the combustion engine, must be provided. Had the combustion engine been previously switched off, for example in order to reduce fuel consumption, said combustion engine must be restarted. If said combustion engine is not provided with a separate starter, the starting of said combustion engine generally occurs with the aid of the electric machine.

In order to solve this problem, the unexamined German patent application DE 10 2007 050 659 A1 discloses a method in which, for starting the combustion engine, the second clutch is kept disengaged and the clutch associated with the first sub-transmission is engaged at least to the point where said clutch transmits a torque required for starting the combustion engine.

A method is further known from the international WIPO patent application WO 2010/009943, in which in order to start the combustion engine from an electric driving state, the second clutch is engaged when the vehicle is stationary in order to additionally power said combustion engine by means of the electric machine, wherein a gear is engaged in the first sub-transmission having a higher gear ratio than the engaged gear of the second sub-transmission.

When starting the combustion engine according to the unexamined publication of the German patent application mentioned above, a minimum vehicle speed is required in order to start the combustion engine, whereas it is necessary for the vehicle to be stationary in the method according to the unexamined international WIPO patent application.

The known methods cannot be used for situations in which a slow crawl of the vehicle at low speeds is required, in particular for longer periods of time. Such a situation arises, for example, in traffic jams.

SUMMARY OF THE INVENTION

In order to start the combustion engine, particularly at low driving speeds, provision is therefore made in the inventive method for operating the drive device of the motor vehicle for the second clutch to be engaged during the electric driving operation so as to drive the combustion engine by means of the electric machine, for a gear to be simultaneously or subsequently engaged in the first sub-transmission, said gear having a lower gear ratio (i.e. a higher gear) than the engaged driving gear of the second sub-transmission, for the first clutch to then be brought into a slip position and the second sub-transmission to subsequently be brought into a neutral position, for the rotational speed of the electric machine to subsequently be increased at least to a starting rotational speed for the combustion engine with the slip of the first clutch being adjusted to maintain a forward torque of the motor vehicle and for the combustion engine to be started once its starting rotational speed has been reached. The inventive method ensures that the combustion engine can also be started at very low speeds and at the ensuing low rotational speeds without the loss of forward torque. This is substantially achieved by virtue of the fact that a gear is engaged in the first sub-transmission, which gear has a lower gear ratio than the engaged driving gear of the second sub-transmission. In so doing, the combustion engine is coupled to a higher gear than the electric machine—as viewed in the direction of the power flow from the respective drive unit to the driving wheels of the motor vehicle—, whereby a torque flows from the very slowly rotating (driven) combustion engine via the slipping first clutch in the direction of the driving wheels. A power flow to the driving wheels is thereby always ensured, wherein the combustion engine can simultaneously be brought to a rotational speed which is sufficient for starting said combustion engine, the so-called starting rotational speed, at low driving speeds by means of the adjusted slip of the first clutch. Particularly a separate starter motor for the combustion engine can be eliminated by the advantageous method, and therefore the drive device is preferably provided without a separate starter motor. In this situation, a higher frictional loss at the slip clutch however results if the driving speed continues to be low.

The second clutch is therefore preferably disengaged after starting the combustion engine and the rotational speed of the electric machine is again reduced to the output speed thereof and the driving gear is engaged again in the second sub-transmission. As soon as the combustion engine has started, said combustion engine can autonomously direct a torque via the first clutch into the first sub-transmission and thereby to the driving wheels. In the process, the first clutch advantageously continues to be initially situated in the slip position thereof. After reducing the rotational speed of the electric machine to a rotational speed suited to reengaging the driving gear of the second sub-transmission, in particular to the output rotational speed thereof, the desired forward torque is again transmitted to the driving wheels via the electric machine, as was the case prior to the start-up of the combustion engine. By disengaging the first clutch, the motor vehicle can thus be set back into the purely electrical driving operation without the loss of drive torque to the driving wheels.

In order to switch over into an operation in the combustion engine mode, the first clutch is preferably disengaged and a purely electrical intermediate operation is adjusted. By completely disengaging the first clutch, particularly the wear to the first clutch is reduced. The combustion engine is subsequently preferably connected to the sub-transmission having the smallest engaged gear by the clutch of said sub-transmission being brought into slip. This is preferably the sub-transmission 1.

To this end, a gear which is suited to the driving speed and which particularly has a higher ratio than before is preferably engaged in the first sub-transmission and the first clutch is subsequently engaged. By engaging a gear having a higher gear ratio than before in the first sub-transmission, that is to say into a lower gear in comparison to the gear which was connected for starting the combustion engine, preferably into the lowest gear of the first sub-transmission, the high minimum rotational speed of the combustion engine is transformed into a lower output rotational speed to the driving wheels. If the first clutch is engaged again or brought into slip, no or only a slight change in the rotational speed or, respectively, the torque to the driving wheels takes place in the process.

In a very preferable manner, the first clutch is initially brought into a slip position during engagement in order to ensure a jerk-free coupling of the combustion engine. This particularly ensures that the rotational speed at the driving wheels does not change or at least does not change in a jerky and thus noticeable manner.

Provision is further preferably made for the second sub-transmission to be subsequently brought into a neutral position, the electric machine to be switched into an operation in generator mode and the second clutch to be engaged to drive the electric machine. By the term "neutral position" of a sub-transmission, a state is always to be understood in connection with the present patent application, in which a torque is not transmitted from an input shaft of the sub-transmission to an output shaft of said sub-transmission. This is then the case if none of the possible gears of the sub-transmission are engaged. By switching the second sub-transmission into a neutral position, the power flow from said second sub-transmission to the driving wheels is interrupted; thus enabling the electric machine to be operated independently of the driving wheels, in particular with regard to the rotational speed thereof. By engaging the second clutch, the electric machine can then be driven by the combustion engine. If the electric machine is switched into an operation in generator mode, energy is thereby produced and the electrical storage unit is charged.

When bringing the first clutch into a slip position, it is particularly preferable to likewise bring the second clutch into a slip position in order to damp torque fluctuations of the driven combustion engine. The combustion engine, provided said engine is only driven by the electric machine, exerts a drag torque on the drive train or, respectively, the drive device and said drag torque is damped by adjusting the slip positions. The torque fluctuations produced by the combustion engine are particularly damped or filtered.

The method described is preferably carried out at driving speeds of 10 km/h or less, in particular 5 km/h or less. Hence, the driving speed of the vehicle or more precisely motor vehicle is experimentally monitored; and when driving speeds of 10 km/h or less, in particular 5 km/h or less, occur, the method described above is enabled or rather activated.

In a particularly preferred manner, the method is carried out as a function of a charging state of the electrical storage unit associated with the electric machine. To this end, the charging state of the electrical storage unit is monitored and is compared with at least one predefinable threshold value. If the charging state falls below the threshold value and the vehicle is operating in an electrical driving mode with driving speeds of 10 km/h or less, in particular 5 km/h or less, the method described above is carried out. The method can, however, also be carried out when the vehicle is stationary.

For the case that the vehicle is stationary while the drive device is operating in a purely electrical mode, provision is made in a preferable manner and as an alternative to the method described above for a gear to be engaged in both sub-transmissions and for both clutches to be engaged in order to start the combustion engine; and therefore the dual clutch transmission is altogether inhibited and the vehicle is supported by the dual clutch transmission—for example when standing on a hill. The second sub-transmission is subsequently brought into a neutral position so that the rotational speed of the electric machine is independent of the rotational speed of the driving wheels. By running-up the rotational speed of the electric machine to the starting rotational speed of the combustion engine, said combustion engine can now be started, wherein during run-up the first clutch is placed into a slip position in such a manner that the rotational speed continues to equal zero at the driving wheels. As soon as the combustion engine has started and continues to run on its own, the torque produced by said engine is used to support the vehicle by means of the slipping first clutch. If the electric machine is now additionally switched into the operation in generator mode, the combustion engine supports the vehicle on the hill and simultaneously drives the electric machine in order to generate electrical energy that is then preferably supplied to the electrical storage unit. It is therefore possible by means of the alternative method to start the combustion engine and to switch into the operation in generator mode without the holding torque being removed from or interrupted at the driving wheels. A rolling back of the vehicle is reliably prevented at any point in time.

The inventive device is thereby characterized in that the means for starting the combustion engine during the electrical driving operation actuate the drive device according to the method described above. This means that the means control the drive device in such a manner that the second clutch is engaged during the electrical driving operation in order to drive the combustion engine by means of the electric machine, that a gear is simultaneously or subsequently engaged in the first sub-transmission, said gear having a lower gear ratio than the engaged driving gear of the second sub-transmission, that the first clutch is then brought into a slip position and the second sub-transmission is subsequently brought into a neutral position, that the rotational speed of the electric machine is subsequently increased at least to a starting rotational speed for the combustion engine with the slip of the first clutch being adjusted to maintain a forward torque of the motor vehicle and that the combustion engine is started once its starting rotational speed has been reached. The advantages mentioned above thus result from directly aforementioned implementation of the inventive device vis-B-vis the drive device. Said inventive device relates in a particularly preferred manner to a control device which as a means has corresponding signal lines at its disposal, via which said control device is connected or can be connected to the different components of the drive device in order to correspondingly actuate the same. The device or, respectively, control device advantageously further comprises as wherewithal a processor for carrying out the control described above or, respectively, the method described above. Preferred embodiments of the device result from the aforementioned control criteria of the procedural options described.

BRIEF DESCRIPTION OF THE DRAWINGS

The invention is described in detail below with the aid of the drawings. In the drawings.

DETAILED DESCRIPTION

FIGS. 1A to 1K show a simplified depiction of a drive device 1, which is used to drive driving wheels 2, of which only one is indicated, of a motor vehicle not shown in detail here. The drive device 1 is designed as a hybrid drive and in so doing comprises a combustion engine 3, which is operatively connected to the driving wheels 2 via a dual clutch transmission. The dual clutch transmission 4 comprises a first sub-transmission 5, with which a first clutch 6 is associated, as well as a second sub-transmission 7, with which a second clutch is associated. At least the odd gears 1, 3 and if applicable 5 can be adjusted in the first sub-transmission 5; and at least the even gears 2, 4 and if applicable 6 can be adjusted in the second sub-transmission 7. The higher the gear is, the lower the adjusted gear ratio i thereof is. Hence, the first gear G1 in the present embodiment has a gear ratio of i=16, the second gear G2 a gear ratio of i=10 and the third gear G3 a gear ratio of i=6. The drive device 1 further comprises an electric machine 9 which is associated with the second sub-transmission 7. In so doing, the electric machine 9 is in the present case operatively connected to an input shaft of the sub-transmission 7 so that a torque can be exerted by the electric machine 9 on the second sub-transmission power train between the clutch 8 and said second sub-transmission 7. Furthermore, the rotational speed of the input shaft corresponds to the rotational speed of the electric machine 9. The arrow tips plotted in the figures show the direction of the power flow in the drive device 1. If no arrow tips are plotted between two elements of the drive device 1, no power flow takes place in a certain direction. For the sake of clarity, a device embodied as a control device for operating the drive device as well as the means thereof to actuate the drive device is not depicted.

Figure 1A:
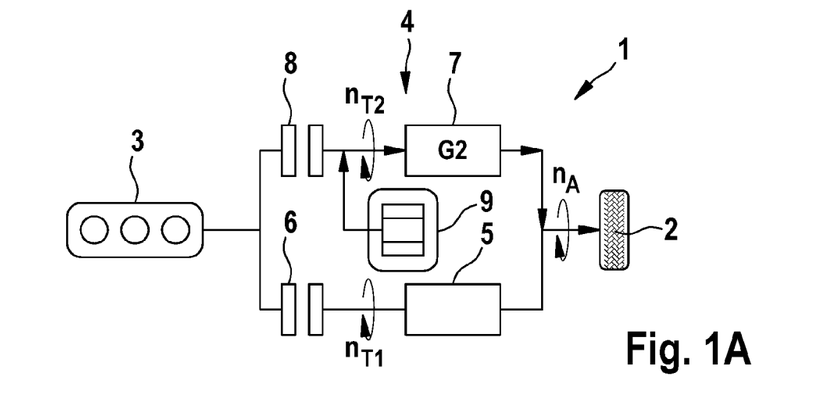
FIGS. 1A to 1K show a method for operating a drive device in step-by-step depictions and FIGS. 2A to 2F show an alternative method for operating the drive device likewise in step-by-step depictions.

FIG. 1A shows the drive device 1 during a purely electrical driving operation. The combustion engine 3 is switched off and both clutches 6, 8 are disengaged. Only the electric machine 9 produces a torque which is transmitted to the driving wheels 2. In an electrical driving operation with particularly low driving speeds, in particular of 5 km/h or less, i.e. at a very slow electrical crawl, a state exists in which the rotational speed is not high enough in any of the engageable gears to crank the combustion engine to a starting rotational speed; thus enabling said engine to continue to run on its own power. This state is critical because in the case of an electrical storage unit reaching a critical charging state, there isn't an obvious option for starting the combustion engine 3 without eliminating the forward torque to the driving wheels 2. In the following FIGS. 1B to 1K, a method is now to be described step by step, by means of which the starting of the combustion engine is nevertheless possible in the described critical state without interrupting the forward torque to the driving wheels 2. It is assumed in the example described that the driving speed and/or the forward torque of the motor vehicle is constant.

Figure 1B:
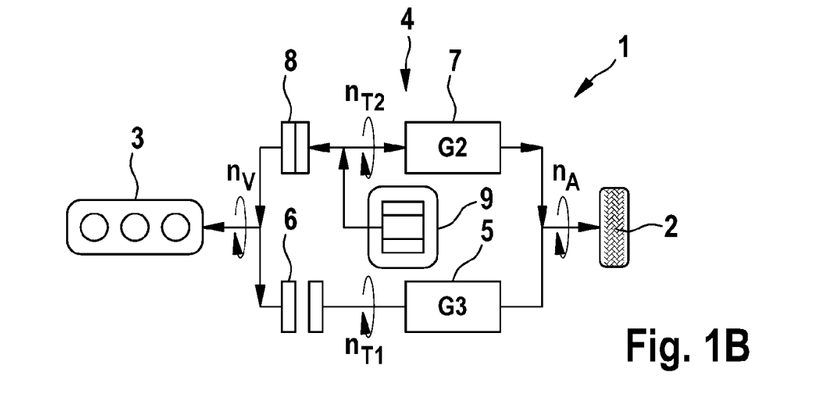

In a first step pursuant to FIG. 1B, the clutch 8 is engaged so that the drive torque of the electrical machine 9 is transmitted to the drive shaft of the combustion engine 3, and therefore the rotational speed nv of the combustion engine corresponds to the rotational speed nT2 of the input shaft of the second sub-transmission 7. Whereas in the sub-transmission 7, the gear G2 is engaged, the third gear G3 is engaged in the sub-transmission 5 so that a rotational speed nT1, which is less than the rotational speed nT2, occurs at the input shaft of the first sub-transmission 5 on the basis of the gear ratio i=6. In the following exemplary embodiment, the electric machine 9 is, for example, operated at a rotational speed of 100 revolutions per minute, which leads to a rotational speed of 10 revolutions per minute at the driving wheel 2 and to 60 revolutions per minute at the input shaft of the sub-transmission 5 (nT1) due to the engaged second gear G2.

Figure 1C:
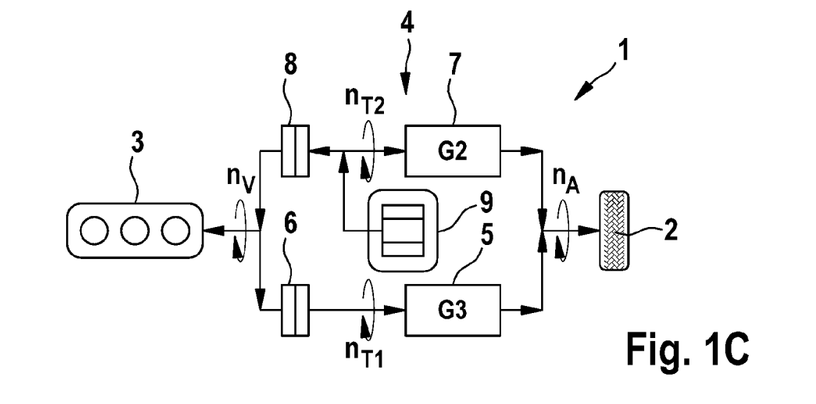

The first clutch 6 is subsequently brought into a slip position, as depicted in FIG. 1C. Because the third gear G3 is engaged in the second sub-transmission 7, the rotational speed on the side of the combustion engine 3 is greater than on the side of the first sub-transmission 5; thus enabling the power flow from the combustion engine 3 to be directed to the first sub-transmission 5 via the clutch 6.

Pursuant to FIG. 1D, the second sub-transmission 7 is subsequently brought into a neutral position G0; and therefore a torque is no longer transmitted from the electric machine 9 via the sub-transmission 7 to the driving wheels 2.

Figure 1D:
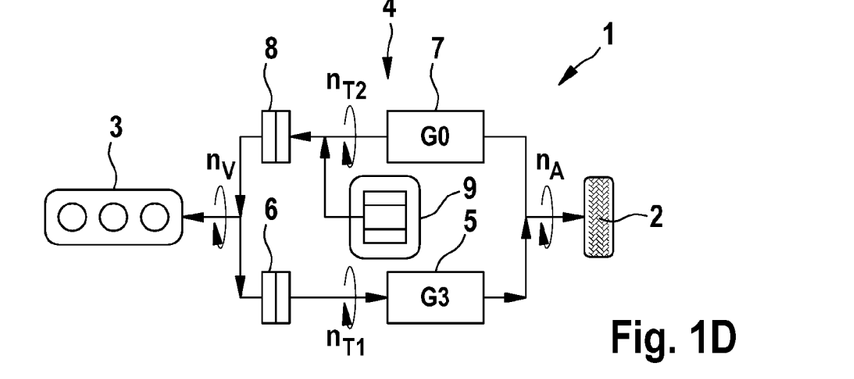
Figure 1E:
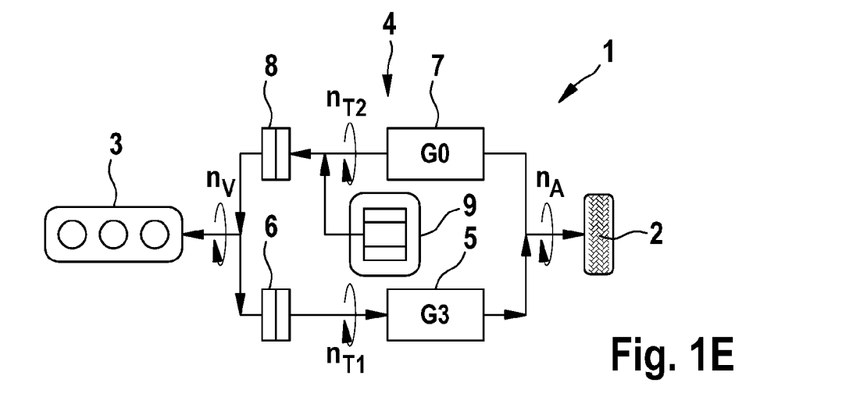

In the next step as depicted in FIG. 1E, the rotational speed nT2 of the electric machine 9 is increased to 700 revolutions per minute or, respectively, to a starting rotational speed of the combustion engine 3. Because no gear is engaged in the second sub-transmission, the increase in rotational speed does not affect the driving wheels 2. The slip of the first clutch 6 is thereby adjusted in such a manner that the torque transmitted from the electric machine 9 via the clutch 8 to the combustion engine 3 is transmitted to the first sub-transmission 5 such that a forward torque or, respectively, the desired forward torque continues to be implemented at the driving wheels 2. As a result of the increased rotational speed of the electric machine 9 of nT2=700 revolutions per minute, the combustion engine 3 is also driven at an increased rotational speed of nV=700 revolutions per minute. In the present exemplary embodiment, the rotational speed of 700 revolutions per minute corresponds to the starting rotational speed of the combustion engine 3. Provision can, of course, be made for other starting rotational speeds, for example of 200 revolutions per minute.

Figure 1F:
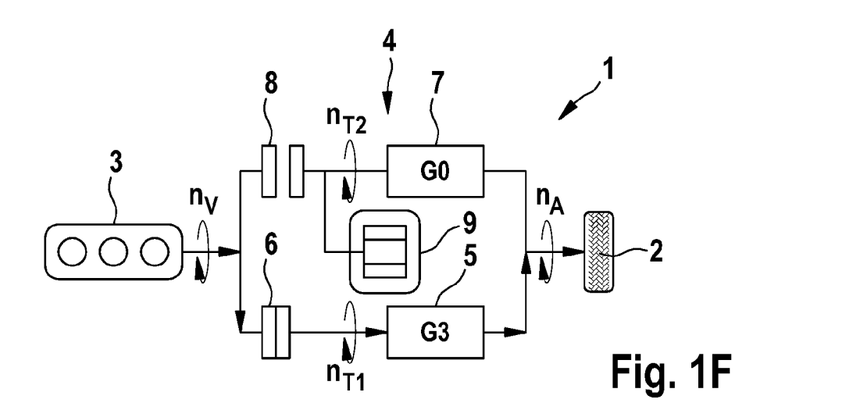

Pursuant to FIG. 1F, the combustion engine 3 is started in the next step; thus enabling said engine to run independently. The second clutch 8 is engaged preferably after as short a time as possible after the start of the combustion engine 3 has taken place. In so doing, the rotational speed of the electric machine 9 can be adjusted independently of that of the combustion engine 3 and the driving wheels 2.

Figure 1G:
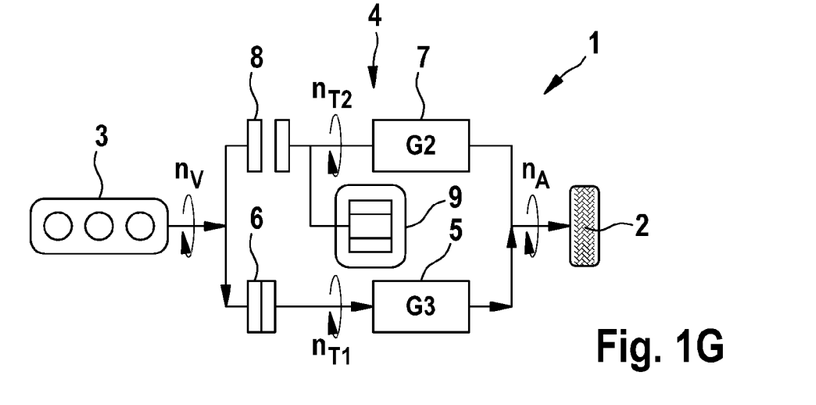
Figure 1H:
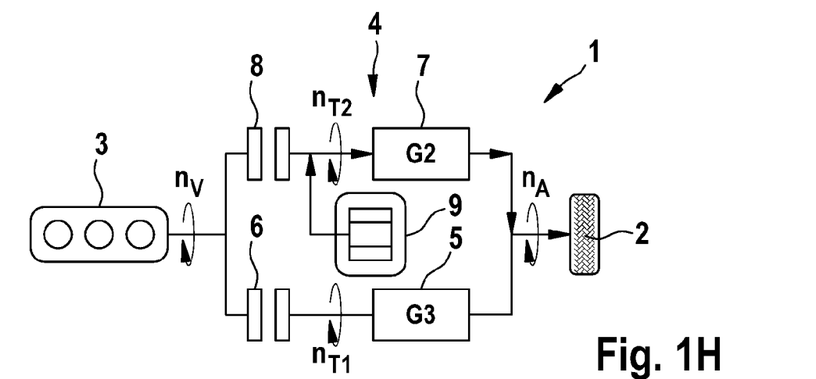

In the succeeding step pursuant to FIG. 1G, the rotational speed nT2 of the electric machine 9 is reduced to the output rotational speed thereof of 100 revolutions per minute and subsequently the second gear G2 in the sub-transmission 7 is engaged again. In the following step pursuant to FIG. 1H, the electric machine 9 can thereby resume the propulsion of the motor vehicle at a rotational speed nA of the driving wheels 2 in the slow crawl operation, and the combustion engine 3 can continue running independently. For that reason, the clutch 6 is disengaged again as depicted in FIG. 1H. The initial state of the slow electrical driving operation, pursuant to FIG. 1A, is thus achieved again in this step with the exception that the combustion engine 3 has been started. By means of the method, as it was explained in reference to the FIGS. 1A to 1H, it is possible to start the combustion engine 3 out of the electrical operation even at slow driving speeds of the motor vehicle without the driver noticing any jerking sensations and without the driving speed being changed. In so doing, a forward or, respectively, drive torque is maintained at or, respectively, made available to the driving wheels 2 during the entire method.

As an alternative to the approach depicted, it is also conceivable not to completely engage the second clutch 8 in the states pursuant to the FIGS. 1B to 1D, but to also bring said second clutch into a slip position so that, for example, untrue rotational movements, i.e. torque fluctuations, of the slowly driven combustion engine 3 do not arrive at the driving wheels 2.

Figure 1I:
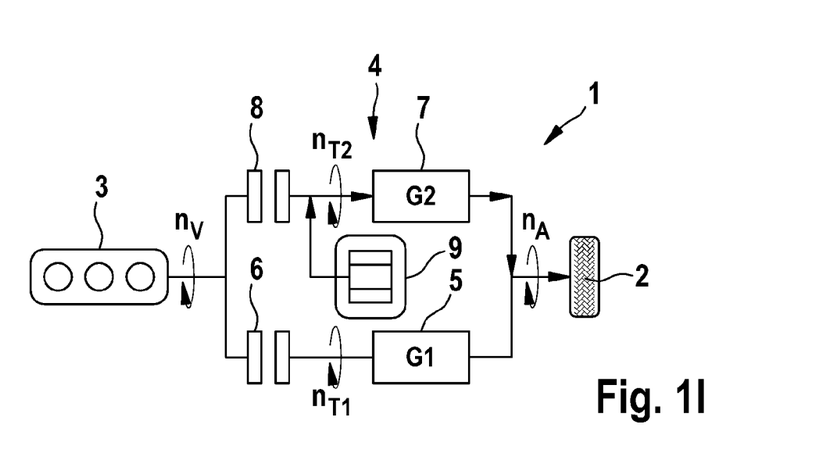

In order to now charge the electrical storage units of the motor vehicle, a lower gear having a higher gear ratio than before, i.e. a gear having a higher gear ratio than the gear G3, is engaged in the first sub-transmission 5 in the following step pursuant to FIG. 1I. In this case, this is the lowest first gear G1 having a gear ratio of i=16. The rotational speed nA of the driving wheels 2 thereby leads to the rotational speed nT1 of 160 revolutions per minute being reached. The rotational speed difference between the rotational speeds nV and nT1 is thereby reduced.

Figure 1J:
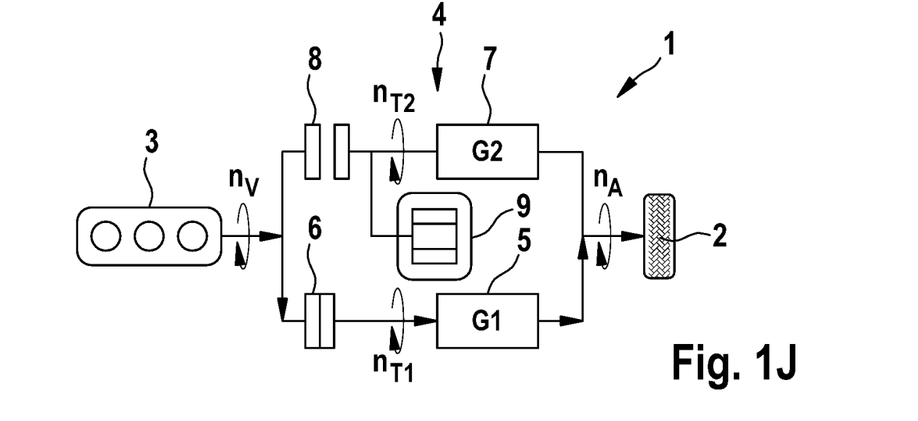

In the following step according to FIG. 1J, the first clutch 6 is brought into a slip position, and therefore the drive torque of the combustions engine 3 is also transmitted via the clutch 6 and the first sub-transmission 5 to the driving wheels 2. In this state, the slip clutch 6 has less frictional losses than in FIGS. 1F and 1G. The second sub-transmission 7 is thereafter preferably brought into a neutral position G0, therefore a gear is not engaged; thus enabling an operation purely in the combustion engine mode to occur.

Figure 1K:
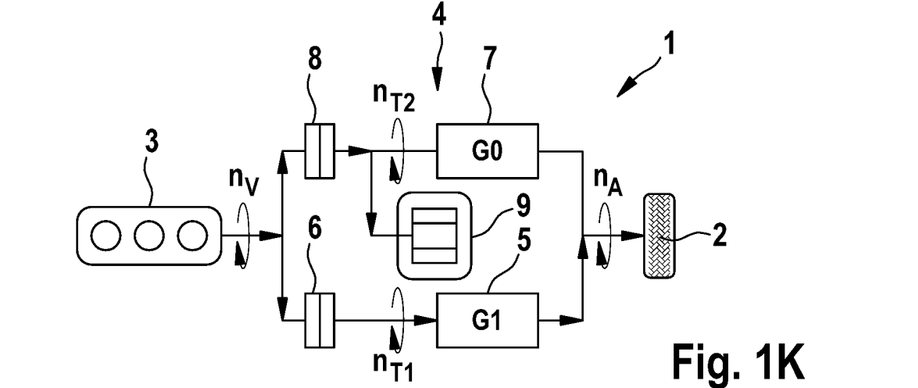

Pursuant to FIG. 1K, the second clutch 8 is finally engaged and the electric machine 9 is switched over into an operation in generator mode; thus enabling the torque produced by the combustion engine 3 to be transmitted to the electric machine 9 in order to drive the same. As a result of switching over to the operation in generator mode, electrical energy is thereby produced which is advantageously supplied to the electrical storage unit. The rotational speed nT2 then corresponds to the rotational speed nV. The drive device 1 is now situated in the generator mode in which the combustion engine is used to drive the motor vehicle as well as to drive the electric machine 9 in order to charge the electrical storage unit.

If the vehicle does not move in the electrical operation thereof, for example because a hill is so steep that the electrical crawl torque can only keep the vehicle stationary, the combustion engine 3 has to be started while the vehicle is stationary. Because the stationary state is energetically disadvantageous, it is useful in principle to support the vehicle with the combustion engine 3 at standstill if the clutch 6 is engaged and a gear in the sub-transmission 5 is engaged. This is, however, only possible as long as this condition does not change. If the electrical storage unit is to be supplied with energy, the combustion engine 3 has to thus be started and the electrical machine 9 has to enter into operation in the generator mode. By means of the method described below, this can successfully occur even without the vehicle rolling backwards in an undesirable manner on a hill, thus without a forward torque or rather holding torque diminishing. To this end, an alternative method for starting the combustion engine 3 is explained with the aid of FIGS. 2A to 2F.

Figure 2A:
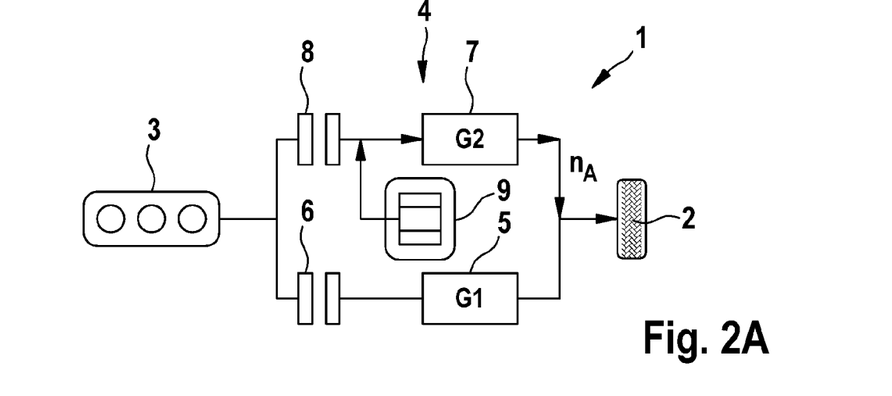

FIG. 2A shows the drive device pursuant to FIG. 1A with the exception that the vehicle is stationary, thus the rotational speed nA=0. The vehicle is thereby supported by the torque generated by the electric machine 9 via the second sub-transmission 7.

Figure 2B:
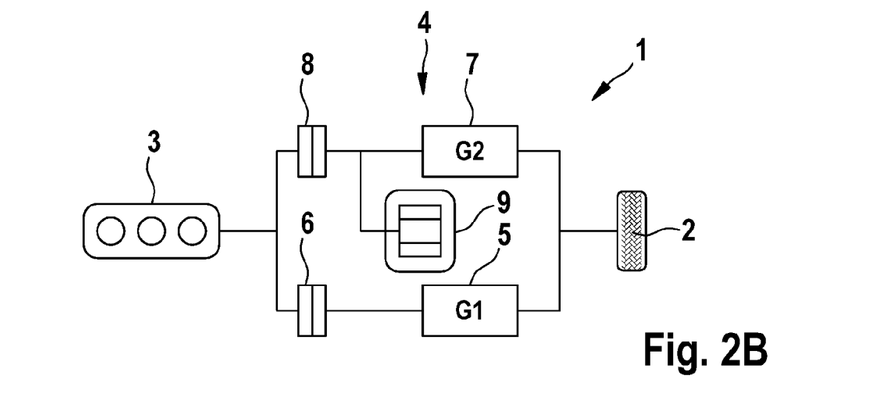

In order to hold the vehicle stationary with little expenditure of energy, both clutches 6 and 8 are preferably engaged as depicted in FIG. 2B, while the first gear G1 is engaged in the first sub-transmission 5 and the second gear G2 is engaged in the second sub-transmission 7. As a result, the two sub-transmissions are seized to one another so that the driving wheels 2 support the motor vehicle, namely via the seized sub-transmissions 5, 7, even without a torque generated by the electric machine 9.

Figure 2C:
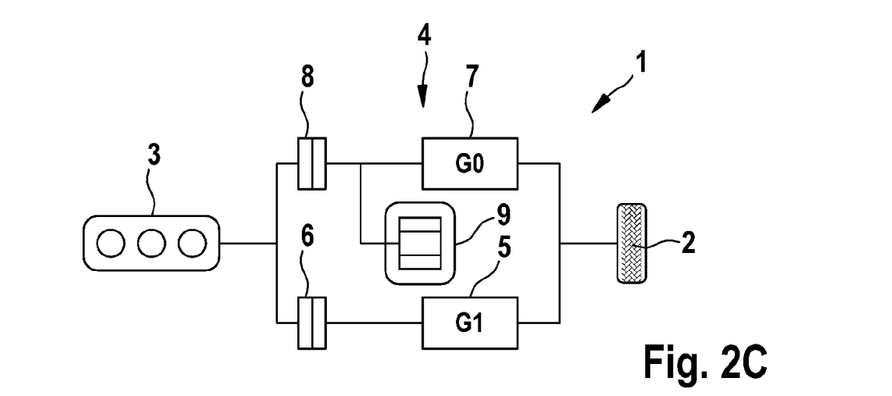

In order to start the combustion engine 3, the second sub-transmission 7 is brought into a neutral position G0 pursuant to FIG. 2C. The motor vehicle continues to remain supported by the combustion engine 3 at standstill via the first sub-transmission 5 and the engaged clutch 6.

Figure 2D:
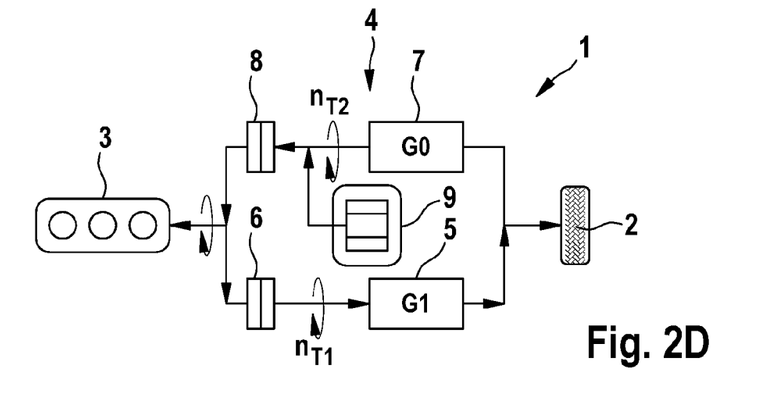

Pursuant to FIG. 2D, the rotational speed of the electric machine 9 is subsequently increased to the starting rotational speed of the combustion engine at, for example, 700 revolutions per minute, and the first clutch 6 is brought into a slip position so that the rotational speed is not transmitted to the first sub-transmission. The slip of the clutch 6 is thereby preferably adjusted such that the rotational speed nT1=0 and therefore the vehicle continues to stay stationary despite the location on the hill.

Figure 2E:
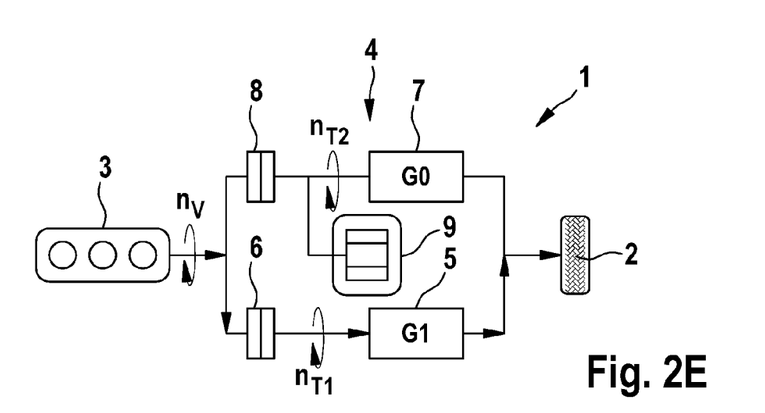

Pursuant to FIG. 2E, the combustion engine 3 is subsequently started, whereby the power flow changes to the extent that the torque from the combustion engine 3 is transmitted via the clutch 6 to the sub-transmission 5 and consequently to the driving wheels 2. In this way, a support via the slip clutch 6 in the combustion engine 3 and no longer at the electric machine 9 (pursuant to FIG. 2D) takes place.

Figure 2F:
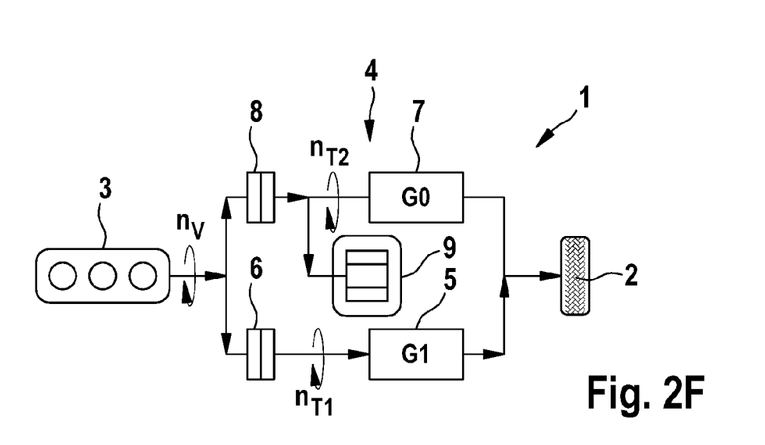

Pursuant to FIG. 2F, the electric machine 9 is preferably switched over to an operation in generator mode so that the torque produced by the combustion engine 3 generates electrical energy and is supplied to the electrical storage unit. The clutch 6 is thereby located in the slip position until a forward propulsion of the vehicle against the hill gradient is desired. The clutch 8 is, on the other hand, completely engaged so that the rotational speed nT2 corresponds to the rotational speed nV.

The invention claimed is:

1. Method for operating a drive device of a motor vehicle, said drive device including at least one combustion engine and at least one electric machine, as well as a dual clutch transmission which can be functionally connected to the combustion engine and which comprises a first sub-transmission, a first clutch being associated therewith, and a second sub-transmission, a second clutch and the electric machine being associated therewith; wherein in a purely electrical driving operation, the electric machine is operated in a motorized manner, a driving gear is engaged in the second sub-transmission and both clutches are disengaged, wherein to start the combustion engine during the electric driving operation
   the second clutch is engaged so as to drive the combustion engine by means of the electric machine, a gear is engaged in the first sub-transmission, said gear having a lower gear ratio than the engaged driving gear of the second sub-transmission, the first clutch is brought into a slip position and the second sub-transmission is subsequently brought into a neutral position, the rotational speed of the electric machine is increased at least to a starting rotational speed for the combustion engine with the slip of the first clutch being adjusted to maintain a forward torque of the motor vehicle, and the combustion engine is started once its starting rotational speed has been reached.

2. The method according to claim 1, wherein the second clutch is disengaged after starting the combustion engine and the rotational speed of the electric machine is reduced and the driving gear is again engaged in the second sub-transmission.

3. The method according to claim 2, wherein the first clutch is initially disengaged and a purely electrical intermediate operation is adjusted in order to switch over into an operation in the combustion engine mode.

4. The method according to claim 3, wherein a gear having a higher gear ratio than before is engaged in the first sub-transmission and the first clutch is subsequently engaged again or brought into slip.

5. The method according to claim 4, wherein the first clutch is initially brought into the slip position in order to ensure a jerk-free coupling of the combustion engine.

6. The method according to claim 4, wherein the second sub-transmission is brought into a neutral position, the electric machine is switched into an operation in generator mode and the second clutch is engaged to drive the electric machine.

7. The method according to claim 1, wherein when bringing the first clutch into a slip position, the second clutch is likewise brought into a slip position in order to damp torque fluctuations of the combustion engine.

8. The method according to claim 1, wherein the implementation thereof at driving speeds of 10 km/h or less, in particular of 5 km/h or less.

9. The method according to claim 1, wherein the implementation thereof is carried out as a function of a charging state of an electrical storage unit associated with the electrical machine.

10. A device for operating a drive device of a motor vehicle, said drive device including at least one combustion engine and at least one electric machine, as well as a dual clutch transmission which can be functionally connected to the combustion engine and which comprises a first sub-transmission, a first clutch being associated therewith, and a second sub-transmission, a second clutch and the electric machine being associated therewith, wherein the device includes a controller for controlling the drive device and wherein said controller is configured to control the drive device for a purely electrical driving operation such that the electric machine is operated in a motorized manner, a driving gear is engaged in the second sub-transmission and both clutches are disengaged, wherein to start the combustion engine during the electric driving operation, said controller actuates the drive device in such a way that the second clutch is engaged so as to drive the combustion engine by means of the electric machine, a gear is engaged in the first sub-transmission, said gear having a lower gear ratio than the engaged driving gear of the second sub-transmission, the first clutch is brought into a slip position and the second sub-transmission is subsequently brought into a neutral position, the rotational speed of the electric machine is increased at least to a starting rotational speed for the combustion engine with the slip of the first clutch being adjusted to maintain a forward torque of the motor vehicle, and the combustion engine is started once its starting rotational speed has been reached.

\* \* \* \* \*